(12) United States Patent
Coury et al.

(10) Patent No.: US 8,740,525 B2
(45) Date of Patent: Jun. 3, 2014

(54) CARGO RESTRAINT SYSTEM

(71) Applicant: Setwear Products, Inc., Canoga Park, CA (US)

(72) Inventors: Lance Michael Coury, West Hills, CA (US); Steven Brian Weber, Hidden Hills, CA (US); Lance Richard Coury, West Hills, CA (US)

(73) Assignee: Setwear Products, Inc., Canoga Park, CA (US)

( * ) Notice: Subject to any disclaimer, the term of this patent is extended or adjusted under 35 U.S.C. 154(b) by 0 days.

(21) Appl. No.: 13/671,710

(22) Filed: Nov. 8, 2012

(65) Prior Publication Data

US 2013/0121785 A1    May 16, 2013

Related U.S. Application Data

(60) Provisional application No. 61/559,273, filed on Nov. 14, 2011.

(51) Int. Cl.
*B60P 7/08*    (2006.01)

(52) U.S. Cl.
USPC .......................................... 410/118; 410/100

(58) Field of Classification Search
USPC .............. 410/96, 97, 100, 117, 118; 248/499; 296/100.15, 100.16; 87/2
See application file for complete search history.

(56) References Cited

U.S. PATENT DOCUMENTS

| | | | |
|---|---|---|---|
| 3,552,613 A | 1/1971 | Nye | |
| 4,632,217 A | 12/1986 | Markwell et al. | |
| 4,763,944 A | 8/1988 | Fry et al. | |
| 4,964,771 A | 10/1990 | Callihan | |
| 5,186,587 A | 2/1993 | Moore | |
| 5,193,955 A * | 3/1993 | Chou | 410/100 |
| 5,290,086 A | 3/1994 | Tucker | |
| 5,458,447 A | 10/1995 | Clason | |
| 6,345,944 B1 | 2/2002 | Florence | |
| 6,745,861 B2 | 6/2004 | Hare | |
| 6,783,311 B2 * | 8/2004 | Sauerwald | 410/97 |
| 7,448,836 B2 | 11/2008 | Clarke et al. | |

* cited by examiner

*Primary Examiner* — Stephen Gordon
(74) *Attorney, Agent, or Firm* — Kelly & Kelly, LLC

(57) ABSTRACT

A cargo restraint system for securing cargo within a truck bed having fixed anchors includes a plurality of adjustable-length straps attachable to the truck bed, and a cargo net attached to the straps and slidable along at least a portion thereof. Hooks are fixed to the straps for attaching the straps to the truck bed anchors, and each strap includes a cam buckle for selectively adjusting the length of the strap.

11 Claims, 3 Drawing Sheets

CARGO RESTRAINT SYSTEM

FIELD OF THE INVENTION

This invention relates to a laterally adjustable truck bed webbing that stretches across the tailgate or cargo area of a truck and operates to keep cargo secure while eliminating cargo shifting.

BACKGROUND OF THE INVENTION

The pickup truck is a utility vehicle with an open rear cargo area (commonly referred to as the "bed") and a passenger cab located just behind the engine. Pickups are designed for hauling or pulling heavy loads.

Pickup trucks are manufactured by different automobile companies all over the world and are available in many different sizes and styles. Compact pickups, such as the Ford Ranger or Chevrolet Colorado, typically seat two people and have a smaller towing capacity. Full-size pickups can usually seat three or four people and have much larger engines. Pickup trucks can also be even larger with double rear tires (usually referred to as "duallies") which serve to allow for an even heavier towing capacity. But regardless of the pickup size, all pickup beds commonly feature a cargo area with a tailgate that lowers to allow for loading and unloading.

Pickup beds come in sizes that range from short to long with a short bed stretching back a few feet behind the cab. A long bed may be as long as eight feet. The bed of the a pickup is most commonly formed with the rear of the cab making up one side of the cargo area with two sides being formed by raised panels extending from the cab with the final side being formed by the tailgate. The tailgate can be raised or lowered on a hinge to allow for loading and unloading.

Pickup trucks are most useful for hauling items that would be difficult to fit into a closed cab vehicle like a regular car or minivan. Additionally, pickup trucks are also useful for transporting items that are very heavy, even though they may not be large. Such heavy items may be difficult to lift into a smaller vehicle, but are easy to lift into the bed of a pickup truck. A problem arises, however, when a pickup truck user wishes to transport an item in the bed of his pickup that is either smaller than the pickup bed, or does not fit inside the bed when the tailgate is raised. In such a situation, the item is liable to slide around inside the pickup bed and be damaged by hitting the sides of the bed, or to fall out of the bed entirely because the tailgate cannot be raised all the way. In such situations, a need arises for alternate means for securing a load inside the bed of a pickup truck.

The prior art teaches several types of restraint systems that can be used in the bed of a pickup truck. For example, U.S. Pat. No. 4,964,771 to Callihan discloses a cargo restrainer that is a piece of flexible material that is suspended between two cords that run along the long sides of the flexible material. Once the flexible material is positioned over the cargo, the cords are tied down to anchors that are mounted inside the truck bed. Similarly, U.S. Pat. No. 4,763,944 to Fry discloses a tailgate barrier that is a net with incorporated stiffening members that attach to a mounted attach point inside the truck bed.

Other restraint systems include straps, clamps, buckles, and clips but nothing in the prior art provides a restraint system that is fully adjustable, expandable, shrinkable, and self-conforming. Likewise, the prior art restraint systems do not teach a system that does not require special hardware or tools in order to attach to the inside of a pickup truck bed. The present invention meets these needs and provides other related advantages.

SUMMARY OF THE INVENTION

A cargo restraint system is disclosed for securing cargo within a truck bed having fixed anchors. The cargo restraint system comprises a plurality of adjustable-length straps which are attachable to the truck bed, and a cargo net attached to the straps and slidable along at least a portion thereof.

Hooks are fixed to the straps for attaching the straps to the truck bed anchors. Each strap includes a cam buckle for selectively adjusting the length of the strap.

The straps comprise a heavy duty nylon net. Similarly, the cargo net comprises a heavy duty nylon net. This cargo net material is compressible allowing the cargo net to conform to the shape of cargo to be restrained within the truck bed. The cargo net can easily be adjusted to fit around large or oddly shaped pieces of cargo to ensure that the cargo does not slide around the truck bed or fall out of the vehicle. The cargo restraint system of the present invention is advantageously lightweight, strong and easy to use.

Other features and advantages of the present invention will become apparent from the following more detailed description, taken in conjunction with the accompanying drawings which illustrate, by way of example, the principles of the invention.

BRIEF DESCRIPTION OF THE DRAWINGS

The accompanying drawings illustrate the invention. In such drawings.

DETAILED DESCRIPTION OF THE PREFERRED EMBODIMENT

The cargo restraint system 10 of the present invention is fully adjustable, expandable and shrinkable. It automatically conforms to the load it is restraining and features adjustable buckles and variable length straps. The cargo restraint system 10 is also lightweight, strong, and easy to store. These features are illustrated in the following figures.

Figure 1:
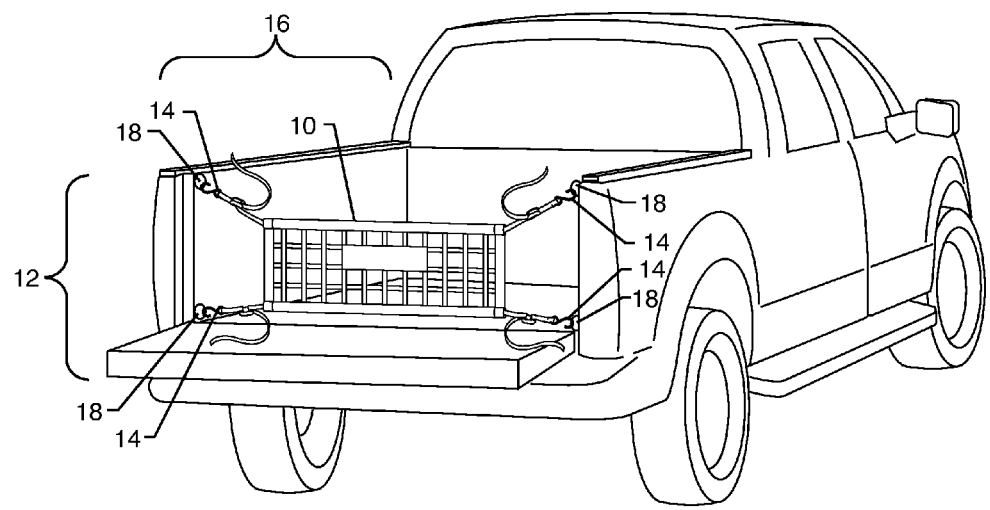
FIG. 1 is a perspective view of the rear of the pickup truck with the cargo restraint system of the present invention in place.

FIG. 1 shows the cargo restraint system 10 employed across the back-end of a pickup truck 12. Here it can be seen that the cargo restraint system 10 features hooks 14 that allow for attachment to the truck bed 16 via pre-existing loops or fixed anchors 18 inside the truck bed 16. Thus, there is no need for any special hardware or mounts in order to secure the cargo restraint system 10. Likewise, attaching the cargo restraint system 10 requires no tools because the hooks 14 attach easily by hand to the truck bed 16.

Figure 2:
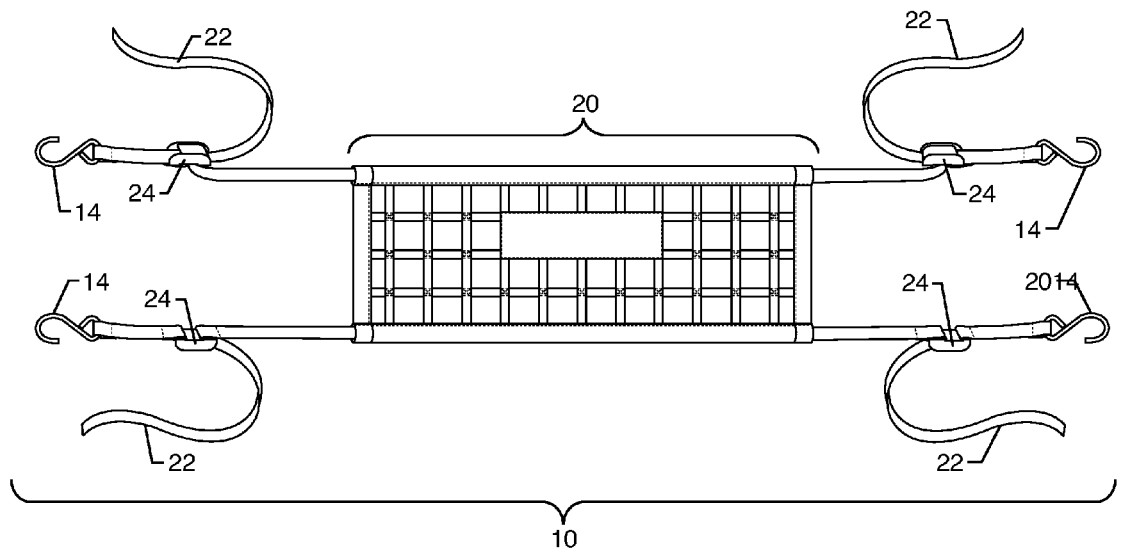
FIG. 2 is a front elevated view of the cargo restraint system of the present invention.

FIG. 2 shows the cargo restraint system 10 with the cargo net 20 positioned in the center of the adjustable straps 22. Also illustrated in this figure are heavy duty cam buckles 24 that are situated along the adjustable straps 22 and attached to the hooks 14. These cam buckles 24 allow for the straps 22 to be shortened or lengthened. For example, if the cargo 26 is shorter than the length of the truck bed 16, a user would shorten the straps 22 so that the cargo net 20 is held taut across the end of the truck bed 16. But if the cargo 26 was longer than the length of the truck bed 16 (such that a portion of the cargo 26 was extending beyond the truck bed 16), the user would lengthen the straps 22 so that the cargo net 20 could wrap around the cargo 26.

Figure 3:
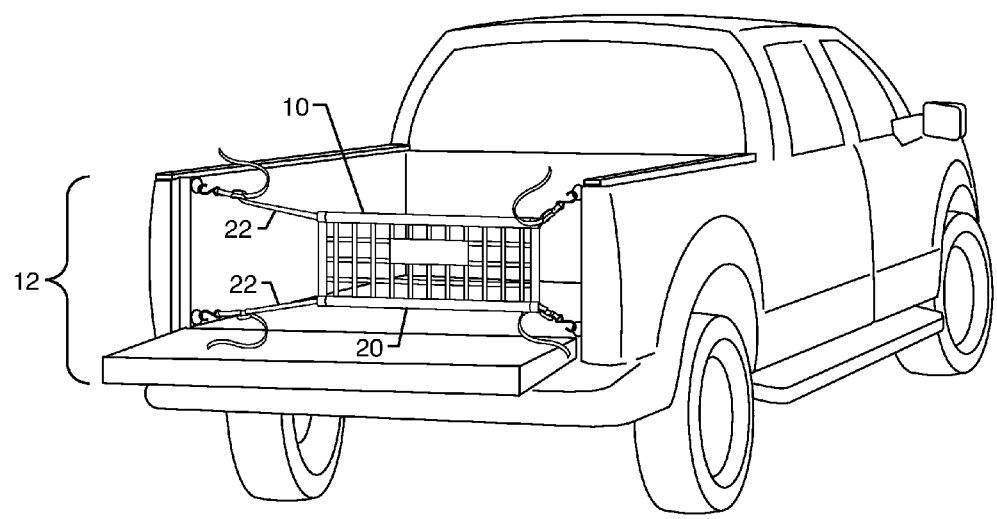
FIG. 3 is a perspective view, similar to FIG. 1, with the cargo restraint system of the present invention in place and adjusted to the side of the truck bed.

FIG. 3 shows the cargo restraint system 10 employed across the back-end of a pickup truck 12. Additionally, this figure illustrates adjustability of the cargo net 20. The cargo net 20 of the cargo restraint system 10 is made from heavy duty nylon net that is formed around the adjustable straps 22, but not connected to the adjustable straps 22. In this way, the cargo net 20 is adjustable along the length of the straps 22 by sliding the cargo net 20 from one side to the other. Because the cargo net 20 is not stitched or otherwise integrally formed to the straps 22, it can be moved along the straps 22 while still remaining functionally formed with the straps 22. This allows the user to customize the cargo net 20 to fit an irregularly shaped piece of cargo 26.

Figure 4:
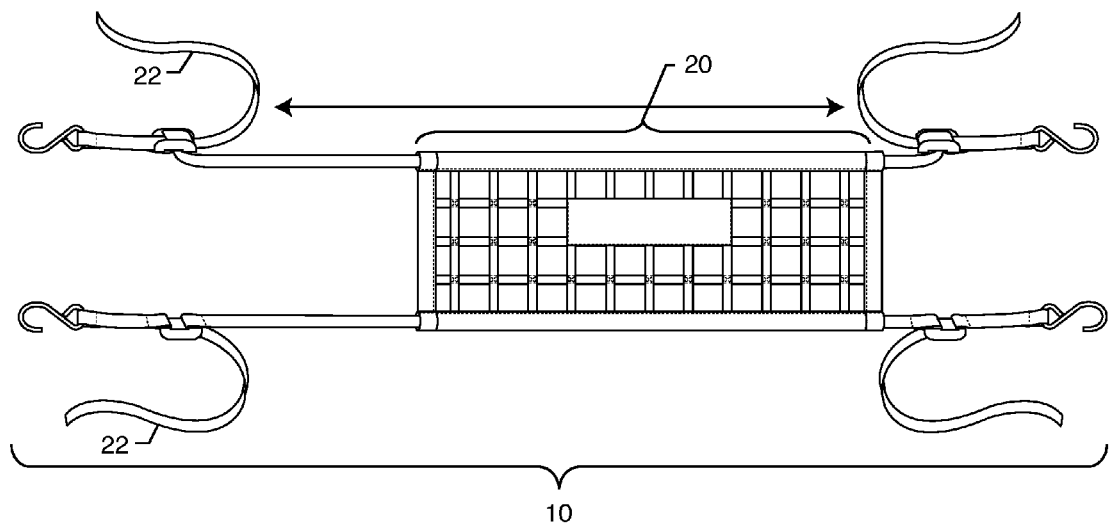
FIG. 4 is a front elevated view of the cargo restraint system of the present invention illustrating the side-to-side adjustability of the cargo net.

FIG. 4 is the cargo restraint system 10 with the cargo net 20 adjusted to one side. The directional arrow in FIG. 4 shows that the cargo net 20 is slidable from one side of the adjustable straps 22 to the other.

Figure 5:
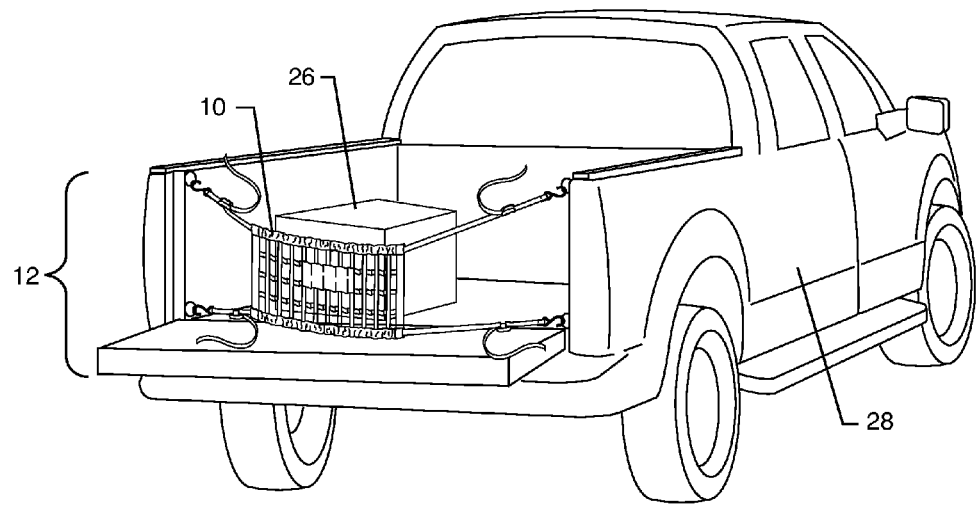
FIG. 5 is a perspective view, similar to FIGS. 1 and 3, with the cargo restraint system of the present invention in place and conformed around a piece of cargo.

FIG. 5 shows the cargo restraint system 10 employed across the back-end of a pickup truck 12 with a piece of cargo 26 that is restrained therein. This figure illustrates the cargo restraint system's 10 ability to shrink and conform around the cargo 26 so as to give a better fit and tighter hold to the cargo 26 while the vehicle 28 is in operation.

Figure 6:
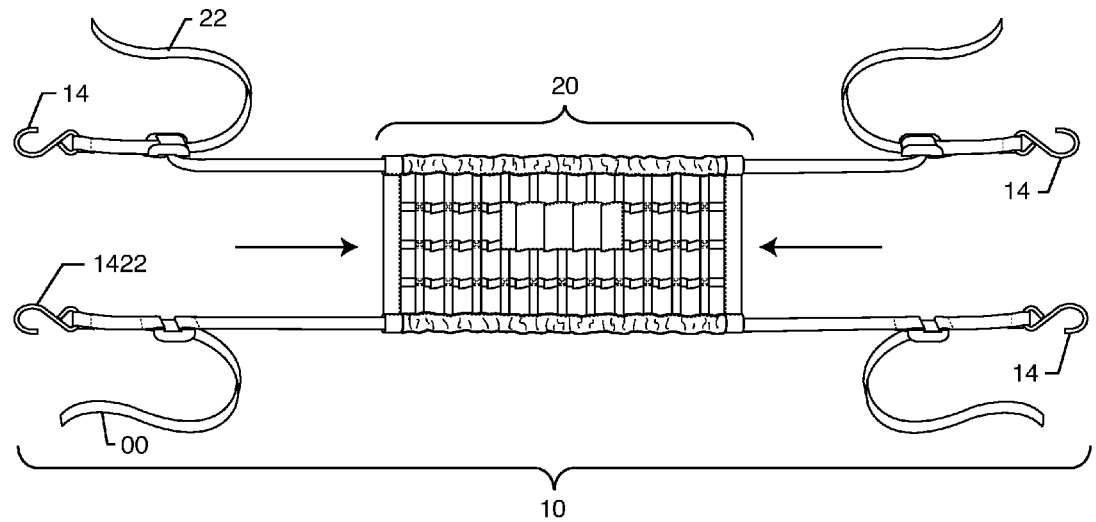
FIG. 6 is a front elevated view of the cargo restraint system, similar to FIGS. 2 and 4, illustrating the compressibility of the cargo net.

FIG. 6 shows the cargo restraint system 10 with the cargo net compressed along the adjustable straps 22. The directional arrows demonstrate the manner in which the cargo net 20 can be compressed. This compressibility is due to the cargo net 20 being made from nylon net with no stiffening members contained therein. This compressibility also means that the cargo restraint system 10 is easy to pack up and store. Additionally, because the cargo restraint system 10 does not utilize heavy stiffening members, it remains lightweight.

The cargo restraint system 10 disclosed here is advantageous over other restraint systems because it is lightweight, strong, and easy to use. The cargo restraint system 10 comprises a cargo net 20 that is formed around adjustable straps 22. The cargo net 20 and the adjustable straps 22 are made from heavy duty nylon net. The cargo net 20 is formed around the adjustable straps 22 such that the cargo net 20 is both slidable along the length of the straps 22 as well as compressible. Thus, the cargo net 20 can easily be adjusted to fit around large or oddly shaped pieces of cargo 26 to ensure that the cargo does not slide around inside the truck bed 16 or fall out of the vehicle 28.

While the cargo net 20 has been described as stretching across the back-end of a pickup truck 12, the cargo net 20 can also stretch over the top of a loaded truck bed 16. Using the cargo net 20 in this way is advantageous for the transport of cargo 26 that may fit inside the truck bed 16 but is too light to be safely transported at higher speeds. Because the cargo net 20 is slidable and compressible, it can be configured to secure any type of load. And since the cargo net 20 utilizes pre-existing loops or fixed anchors 18 inside the truck bed 16, the placement of cargo net 20 is easy to reconfigure. In this way, the cargo net 20 can also be fitted diagonally across the truck bed. The cargo restraint system 10 does not require special hardware, tools, or permanent attach points in order to be securely fitted to a truck bed 16. As stated above, the cargo restraint system 10 features hooks 14 that can be hand-attached to pre-existing loops/fixed anchors 18 inside the truck bed 16. Thus, the cargo restrain system 10 can be utilized in any configuration and when the cargo restraint system 10 is no longer needed, it can be easily detached and stored for later use.

Although a particular embodiment of the invention has been described in detail for purposes of illustration, various modifications may be made without departing from the spirit and scope of the invention. Accordingly, the invention is not to be limited, except as by the appended claims.

What is claimed is:

1. A cargo restraint system for securing cargo within a truck bed having fixed anchors, comprising:
    a plurality of adjustable-length straps attachable to the truck bed, wherein each stray includes a cam buckle for selective adjusting the length of the strap; and
    a cargo net formed around the straps but not connected thereto so as to be slidable along substantially the length of each strap.

2. The cargo restraint system of claim 1, including hooks fixed to the straps for attaching the straps to the truck bed anchors.

3. The cargo restraint system of claim 1, wherein the straps comprise a heavy duty nylon.

4. The cargo restraint system of claim 1, wherein the cargo net comprises a heavy duty nylon net.

5. The cargo restraint system of claim 4, wherein the cargo net is compressible along the length of each strap.

6. A cargo restraint system for securing cargo within a truck bed having fixed anchors, comprising:
    a plurality of adjustable-length straps attachable to the truck bed;
    at least one hook fixed to each strap for attaching the straps to the truck bed anchors; and
    a cargo net formed around the straps but not connected thereto so as to be slidable along substantially the length of each strap, wherein the cargo net comprises a heavy duty nylon net, and wherein the cargo net is compressible along the length of each strap.

7. The cargo restraint system of claim 6, wherein each strap includes a cam buckle for selectively adjusting the length of the strap.

8. The cargo restraint system of claim 6, wherein the straps comprise a heavy duty nylon.

9. A cargo restraint system for securing cargo within an enclosure having fixed anchors, comprising:
    a plurality of adjustable-length straps attachable to the enclosure;
    at least one hook fixed to each strap for attaching the strap to the anchors;
    a cam buckle associated with each strap for selectively adjusting the length of the strap; and
    a cargo net formed around the straps but not connected thereto so as to be slidable along substantially the length of the each strap, wherein the cargo net is compressible along the length of each strap.

10. The cargo restraint system of claim 9, wherein the straps comprise a heavy duty nylon.

11. The cargo restraint system of claim 9, wherein the cargo net comprises a heavy duty nylon net.

* * * * *

UNITED STATES PATENT AND TRADEMARK OFFICE
CERTIFICATE OF CORRECTION

| | | |
|---|---|---|
| PATENT NO. | : 8,740,525 B2 | Page 1 of 1 |
| APPLICATION NO. | : 13/671710 | |
| DATED | : June 3, 2014 | |
| INVENTOR(S) | : Lance Michael Coury et al. | |

It is certified that error appears in the above-identified patent and that said Letters Patent is hereby corrected as shown below:

In the Claims:

In Claim 1, line 4 (column 4, line 24), delete "stray" and insert -- strap --.

In Claim 1, line 5 (column 4, line 25), delete "selective" and insert -- selectively --.

Signed and Sealed this
Ninth Day of September, 2014

Michelle K. Lee
*Deputy Director of the United States Patent and Trademark Office*